Sept. 5, 1950 H. GOLDBERG 2,521,058

FREQUENCY AND PHASE CONTROL SYSTEM

Filed May 28, 1946

Inventor

HAROLD GOLDBERG

By Robert T. Killman

Attorney

Patented Sept. 5, 1950

2,521,058

UNITED STATES PATENT OFFICE 2,521,058

FREQUENCY AND PHASE CONTROL SYSTEM

Harold Goldberg, Baltimore, Md., assignor to Bendix Aviation Corporation, Towson, Md., a corporation of Delaware Application May 28, 1946, Serial No. 672,742

9 Claims. (Cl. 250—36)

This invention relates to frequency control, more particularly to the control of the frequency and phase of a generator of oscillatory energy with reference to the frequency and phase of a separate source of oscillating energy.

Numerous frequency synchronizing systems have been devised. The means employed in such systems usually subjects one oscillator to some form of interactive coupling with that of a second, or reference, oscillator. This demands that the reference oscillator be extremely stable to prevent its being pulled away from the desired frequency. To prevent such interaction a stage of amplification must usually be employed to provide the necessary isolation of one oscillator from another.

Similarly, with such systems the tendency of two different oscillators to operate at the frequencies characteristic of each affects the phase definition. Whether one oscillator will lead or lag in phase, and the magnitude of that difference, depends on how much and in what direction one characteristic frequency differs from the other.

Ordinarily the frequency synchronization of an oscillator with some reference frequency is sufficient to satisfy most requirements. However, in frequency controlled lock-in systems and synchronizing-signal-generators employed in television it is desirable that the phase definition be a characteristic of the means of synchronization. Without such means of establishing and maintaining a definite phase relation of two separate oscillating sources, any adjustment for selecting a desired phase difference is of limited value.

In conjunction with the need for phase definition comes the need for phase measurement. Here we are concerned with fixed frequency phase measurement systems to which this invention is readily applicable as a component part.

An object of this invention is to provide a means of control whereby the phase as well as the frequency of a source of oscillating energy is established and maintained in a definite relation to that of a separate source of oscillating energy.

Another object of this invention is to provide a means whereby a source of oscillating energy, while frequency controlled by a separate source of such energy, retains its characteristic frequency and does not reflect unwanted influence to the controlling frequency source.

A further object of this invention is to provide a frequency control means whereby the controlled frequency of a source of oscillating energy may be identical with that of a controlling reference oscillating energy, or may be any integral fraction of the controlling reference frequency.

Figure 1:
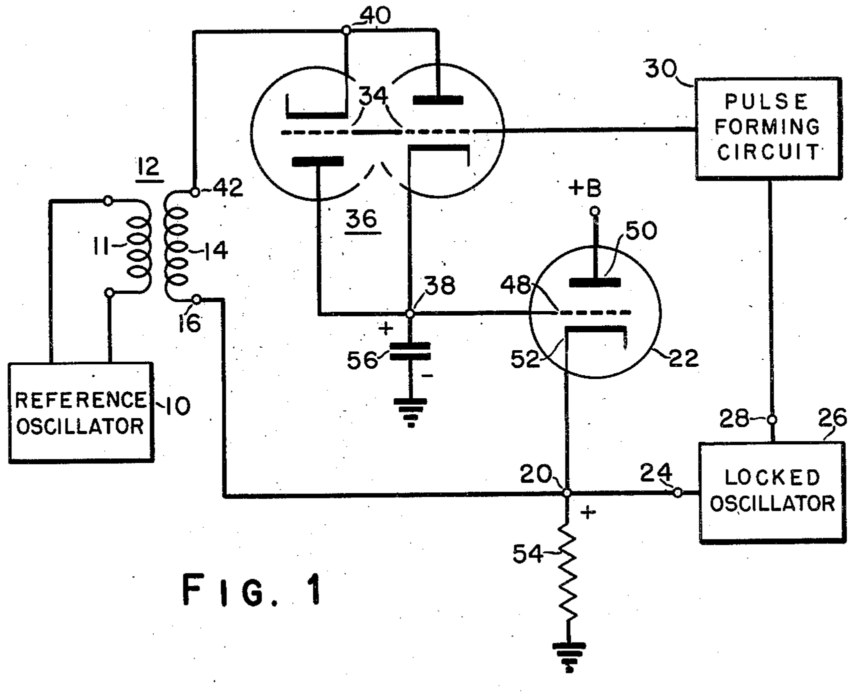

Other objects and advantages of this invention will become apparent from a consideration of the following specification when taken in conjunction with the accompanying drawing, in which:

Fig. 1 is a schematic diagram of a circuit embodying the invention; and

Figure 2:
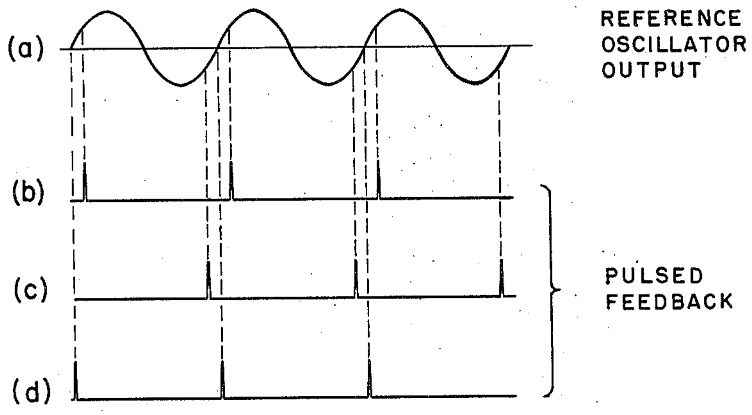

Fig. 2 consists of four curves *a*, *b*, *c*, and *d*, of which curve *a* represents the amplitude of the reference oscillator voltage as a function of time, and curves *b*, *c* and *d* illustrate the time relationships therewith of a family of switch unlocking pulses when the controlled oscillator lags, leads, or is in proper frequency accord with the reference oscillator.

Referring now to Fig. 1, the output of a reference oscillator 10 is applied to the primary 11 of a transformer 12 having a secondary winding 14. One terminal 16 of the secondary winding 14 is connected to a terminal 20 which is the positive voltage output terminal of a cathode follower circuit including a control tube 22. The terminal 20 is connected to the synchronizing terminal 24 of a locked oscillator system 26, the output terminal 28 of which, in turn, feeds a pulse forming circuit 30. The pulsed output of the circuit 30 is applied jointly to the control electrodes 34 of a two-way electronic switch 36 which comprises two triode units of an electron discharge tube or tubes, wherein the cathode of one unit is connected to the anode of the other unit to form one terminal 38 of the switch 36, with the other anode and cathode connected together to form the other terminal 40 of the said switch. The remaining terminal 42 of the secondary winding 14 is connected to the terminal 40 of switch 36, and the terminal 38 of said switch is connected to the control electrode 48 of the control tube 22. The control tube 22 is an electron discharge tube having an anode 50 connected to a source of voltage indicated plus B and a cathode 52 connected to the terminal 20. A resistor 54, connected between the terminal 20 and ground, completes the anode circuit. A capacitor 56 is connected between the terminal 38 and ground. The locked oscillator system 26, and the pulse generating circuit 30, being of types known to the art, are not illustrated nor described in detail herein.

In the Fig. 1 embodiment the electronic switch 36 provides a means to prevent current flow across the terminals of the secondary 14 except during the application of pulses from the output of the pulse forming circuit 30 to the control electrodes 34. Current flow in either direction is permitted for the duration of the pulse. The switch 36 may thus be considered a gating means. No source of cut-off grid bias for the gating means is shown since any one of many conventional forms may be used and may be considered to be included in the circuit indicated by the block 30.

In using the output of a cathode follower, such as that found at the terminal 20, as control voltage for the locked oscillator 26, it may be assumed that the cathode follower is ideal in that the output will equal the input at all times, since this becomes nearly true by proper design. Thus the potential on the capacitor 56 will correspond substantially to that at the output terminal 20.

The locked oscillator 26 is intended to be of such design that its frequency is responsive to a change of control voltage. Thus, the frequency of the oscillator 26 which is to be locked in step with that of the reference oscillator 10 is effectively maintained by providing the necessary control voltage output at terminal 20. Since the pulse forming circuit 30 is driven by the output of the locked oscillator 26, the repetition rate of its pulse output will be controlled by and will follow the frequency of this oscillator.

In operation, the terminal 16 of the secondary winding 14 is maintained at a relatively stable voltage level by its connection to the D. C. control voltage appearing at the terminal 20. With the terminal 16 thus established in voltage, the other terminal 42 of the secondary winding 14 will oscillate, both above and below the potential at terminal 20, at a frequency and amplitude determined by the reference oscillator 10. This oscillating potential, applied at the terminal 40 of the electronic gating means 36, is illustrated by Fig. 2*a*.

At terminal 38, however, the potential across the capacitor 56 is maintained equal to that at the terminal 20. As each pulse fed back from the pulse forming circuit 30 unlocks the gating means 36 at subsequent moments in the oscillation cycle, any difference of potential across the gating means causes current to flow for the duration of the pulse and in the direction of the difference. Should the gating means be opened when the terminal 40 is more positive than the terminal 38, the capacitor 56 will with each pulse, become increasingly more positive. Likewise the control electrode 48 will become more positive, thus causing more anode current to flow in the control tube 22, and thus, an increase in voltage at the terminal 20. This pulse time relation is illustrated by Fig. 2*b*.

Conversely, if the gating means is pulsed at times when the terminal 40 is more negative than the terminal 38, the capacitor 56 and the control electrode 48 will become more negative with each pulse and thus further limit space current in the control tube. The voltage at terminal 20 will be reduced. This relative timing is illustrated by Fig. 2*c*.

Should the grid potential of the control tube 22 change in either direction, the resulting change of output voltage, in the same direction, is fed through the secondary winding 14 and increases the potential difference between terminals 40 and 38. This increase actuates the correction of the output voltage until the proper voltage is reached to cause the locked oscillator to operate at the proper frequency and phase with respect to the reference oscillator. When this condition is reached there will be no potential difference across the electronic switch during the time of the pulse and no further correction of the output voltage will take place. This proper time relation is illustrated by Fig. 2*d*.

The above explanation and illustration describe a condition in which the locked oscillator responds to an increase of control voltage by an increase of frequency. Thus each unlocking pulse occurs at a zero point preceding a positive half-cycle of the reference oscillation wave as in Fig. 2. Should the reverse condition be true, that the locked oscillator responds to an increase in control voltage by a decrease in frequency, the phase relation will be changed by 180° and the unlocking pulses will occur at the zero points preceding the negative half-cycles of the reference oscillation wave. In either case, with proper conditions of timing, the locked oscillator will take on such frequency and phase that the generated pulses occur at alternate zero points of the reference oscillator wave form. This relation will hold over a wide range of reference oscillator frequencies and the range will depend on the range obtainable with the control voltage.

It is also possible for the locked oscillator to operate at one-half or at any other integral submultiple of the reference oscillator frequency.

Several means of controlling the phase relation of the locked oscillator and the reference oscillator are possible. One possible way is to shift the phase at the output of the reference oscillator. Another arrangement is to provide a phase control between the locked oscillator and the pulse forming circuit.

It will be evident from the foregoing that this invention is not limited to the specific circuits and arrangements of parts shown and disclosed herein for illustration but that the underlying concept and principle of the invention is susceptible of numerous variations and modifications coming within the broader scope and spirit thereof as defined by the appended claims. The specification and drawing are accordingly to be regarded in an illustrative rather than a limiting sense.

What is claimed is:

1. Means for controlling the frequency and phase of a source of oscillatory energy in accordance with the frequency and phase of a second source of such energy said means comprising: an electronic gating means; said gating means comprising a pair of electric discharge devices each having an anode, a cathode and a control electrode, the anode of each of said devices being connected to the cathode of the other to constitute a terminal of said gating means; a pulse generating circuit the repetition rate of the output of which is responsive to the frequency of one of said sources; means applying the output of said pulse generating circuit to the control electrodes of said devices, whereby said gating means remains closed in the intervals between the pulses of said output and is open for the duration of each of said pulses; an energy storage means in series with said gating means; a third electric discharge device comprising an anode a cathode and a control electrode; a resistor connected between the cathode of said third discharge device and said energy storage means, said gating means, said energy storage means and said resistor being in series; means impressing the energy level of said energy storage means upon the control electrode of said third discharge device, means coupling the output of the other of said sources across said gating means, said energy storing means, and said resistor; and means applying the cathode potential of said third discharge device to one of said sources to control the frequency thereof.

2. Means for controlling the frequency and phase of a source of oscillatory energy in accordance with the frequency and phase of a second source of such energy, said means comprising: an electronic gating means; said gating means comprising a pair of electric discharge devices each having an anode, a cathode and a control electrode, the anode of each of said devices being connected to the cathode of the other to constitute a terminal of said gating means; a pulse generating circuit the repetition rate of the output of which is responsive to the frequency of one of said sources; means applying the output of said pulse generating circuit to the control electrodes of said devices, whereby said gating means remains closed in the intervals between the pulses of said output and is open for the duration of each of said pulses; an energy storage means in series with said gating means; means applying the output of the other of said sources across said gating means and said energy storage means; means applying a potential substantially equal to that across said energy storage means to one of said sources for the frequency control thereof and means applying said potential to said gating means in a manner to eliminate any potential drop there across due to the charge on said energy storage device.

3. Means for controlling the frequency and phase of a source of oscillatory energy in accordance with the frequency and phase of a second source of such energy, said means comprising: an electronic gating means; said gating means normally being closed; a pulse generating circuit the pulse repetition rate of the output of which is responsive to the frequency of one of said sources; means applying the output of said pulse generating circuit to said electronic gating means, whereby said gating means is opened for the duration of each of the pulses of said output; an energy storage means in series with said gating means; means coupling the output of the other of said sources across said gating means and said energy storage means; means applying a potential substantially equal to that across said energy storage means to one of said sources for the frequency control thereof and means applying said potential to said gating means in a manner to eliminate any potential drop thereacross due to energy stored in said energy storage device.

4. Means for controlling the frequency and phase of a source of oscillatory energy in accordance with the frequency and phase of another source of such energy, said means comprising: an energy storage device; a gating means connected in series with said energy storage device; coupling means applying the output of a first of said sources across said gating means and said storage means; a driving circuit for said gating means responsive to the second of said sources to operate said gating means during identical portions of succeeding cycles of the output thereof; circuit connections applying a potential substantially equal to that across said energy storage means to one of said sources to control the frequency of the output thereof and to said gating means in a manner to eliminate any potential drop thereacross due to the charge on said energy storage means, whereby during each operation of said gating means said energy storage means receives an increment of charge which is proportional to the output voltage level of said first source at that instant.

5. Means for controlling the frequency and phase of one source of oscillatory energy in accordance with the frequency and phase of another source of such energy: said means comprising a circuit for deriving a direct current potential proportioned to the time integral of the phase difference between the said sources of energy, and for applying the said potential to one of said sources to minimize the said phase difference; said circuit comprising a series arrangement of a first of said sources of energy, a pulse controlled gating device, a storage capacitor and a resistor, means associated with said resistor and capacitor to produce a potential change across the said resistor substantially equal and opposed to any potential change across the said capacitor, means for controlling the frequency of one of the said sources of energy in accord with one of said potentials, and means for deriving pulses from the second of said sources of energy and applying them to the gating device.

6. In a circuit for controlling the frequency and phase of one source of oscillatory energy in accordance with the frequency and phase of another source of such energy by deriving a direct current related to the phase difference between the said sources of energy, said circuit including an energy storage capacitor, a gating means in series with said capacitor, coupling means applying the output of a first of said sources across said gating means and said capacitor, a driving circuit for said gating means responsive to the second of said sources to operate said gating means during identical portions of succeeding cycles of the output thereof, and circuit connections applying a potential substantially equal to that across said capacitor to one of said sources to control the frequency of the output thereof: the improvement which comprises means introducing in series with said gating means and storage capacitor a potential change substantially equal to the potential change across said capacitor and opposed thereto.

7. In a circuit as set forth in claim 6, the improvement as claimed therein, said improvement comprising a resistor in series with said storage capacitor and gating device and means cooperating with said storage capacitor and said resistor to produce across said resistor a potential change substantially equal to any potential change across said capacitor and opposed thereto.

8. A phase integrator for comparing the outputs of a pair of sources of oscillatory energy, said integrator comprising a gating means, a storage capacitor and a resistor in series, coupling means applying the output of one of said sources across said series of elements, a driving circuit for said gating means responsive to the output of the other of said sources to operate said gating means during identical portions of succeeding cycles thereof, and means cooperating with said storage capacitor and said resistor to produce across said resistor a potential change substantially equal to any potential change across said capacitor and opposed thereto.

9. A phase integrator for comparing the outputs of a pair of sources of oscillatory energy, said integrator comprising a gating means, a storage capacitor and a resistor in series, coupling means applying the output of one of said sources across said series of elements, a driving circuit for said gating means responsive to the output of the other of said sources to operate said gating means during identical portions of succeeding cycles thereof, and means cooperating with said storage capacitor and said resistor to produce across said resistor a potential change substantially equal to any potential change across said capacitor and opposed thereto, said cooperating means comprising an electric discharge device having an anode, a cathode and a control electrode, said control electrode being connected to the junction of said gating means and said storage capacitor and said cathode being connected between said resistor and said gating means.

HAROLD GOLDBERG.

REFERENCES CITED

The following references are of record in the file of this patent:

UNITED STATES PATENTS

| Number | Name | Date |
|---|---|---|
| 2,201,978 | Bedford | May 28, 1940 |
| 2,209,507 | Campbell | July 30, 1940 |
| 2,335,265 | Dodington | Nov. 30, 1943 |
| 2,434,294 | Ginzton | Jan. 13, 1948 |